United States Patent
Grim, III et al.

(10) Patent No.: US 7,660,770 B2
(45) Date of Patent: Feb. 9, 2010

(54) SYSTEM AND METHOD FOR PROVIDING A SECURE CONTACT MANAGEMENT SYSTEM

(75) Inventors: Clifton E. Grim, III, Seabrook, TX (US); Christopher I. Schmidt, Friendswood, TX (US); John D. Wilson, Houston, TX (US)

(73) Assignee: International Business Machines Corporation, Armonk, NY (US)

( * ) Notice: Subject to any disclaimer, the term of this patent is extended or adjusted under 35 U.S.C. 154(b) by 849 days.

(21) Appl. No.: 10/964,876

(22) Filed: Oct. 14, 2004

(65) Prior Publication Data

US 2006/0085341 A1    Apr. 20, 2006

(51) Int. Cl.
    G06F 21/00    (2006.01)
    G06F 7/00     (2006.01)
(52) U.S. Cl. ................ 705/60; 707/104.1; 713/182
(58) Field of Classification Search ............. 705/50, 705/60; 713/182
    See application file for complete search history.

(56) References Cited

U.S. PATENT DOCUMENTS

| | | |
|---|---|---|
| 5,369,705 A | 11/1994 | Bird et al. |
| 5,774,117 A | 6/1998 | Kukkal et al. |
| 6,157,954 A | 12/2000 | Moon et al. |
| 6,879,960 B2 * | 4/2005 | Nascenzi et al. ............. 705/14 |
| 7,111,172 B1 * | 9/2006 | Duane et al. ................ 713/182 |
| 2002/0052921 A1 | 5/2002 | Morkel |
| 2002/0156895 A1 * | 10/2002 | Brown ........................ 709/226 |
| 2003/0233541 A1 | 12/2003 | Fowler et al. |
| 2004/0236792 A1 * | 11/2004 | Celik ....................... 707/104.1 |
| 2005/0002515 A1 * | 1/2005 | Mewhinney et al. ... 379/266.08 |
| 2005/0091272 A1 * | 4/2005 | Smith et al. ............. 707/104.1 |
| 2005/0144483 A1 * | 6/2005 | Robertson et al. ........... 713/201 |
| 2005/0192008 A1 * | 9/2005 | Desai et al. .............. 455/435.2 |

FOREIGN PATENT DOCUMENTS

| | | |
|---|---|---|
| WO | WO 02/01783 | 1/2002 |
| WO | WO 02/05150 | 1/2002 |

\* cited by examiner

*Primary Examiner*—Charles C Agwumezie
(74) *Attorney, Agent, or Firm*—Greenblum & Bernstein P.L.C.; Anna Linne (57) ABSTRACT

A system and method for providing a Contact Management System (CMS) so that individual owners of personal contact data may control and manage the access and dissemination of the personal data. The owner of personal contact data may securely register the data with secured information vault of the CMS and specify which other parties may have access to the personal data. In this way, duplication of the personal data is avoided, but at the same time is always current. In use, a second party's device, such as a telephone or a PDA may access the CMS database and under public key infrastructure (PKI) controls identify themselves so that access to the owner's personal data may be verified. Once verified, the telephone number or other data may be returned to the device where a call may be automatically placed or otherwise used.

20 Claims, 6 Drawing Sheets

SYSTEM AND METHOD FOR PROVIDING A SECURE CONTACT MANAGEMENT SYSTEM

CROSS REFERENCE TO RELATED APPLICATIONS

This application is being filed concurrently with related co-pending U.S. application Ser. No. 10/965,592 filed Oct. 14, 2004, which is now incorporated by reference in its entirety herein.

DESCRIPTION

1. Field of the Invention

The invention generally relates to a system and method for an information vault and, more particularly, to a system and method for sharing personal information with others via an information vault and controlling access to that information.

2. Background Description

As the world becomes more wired and electronic storage becomes cheaper than the cost of paper, the protection of information becomes paramount. The ease with which information can be copied and propagated causes serious information privacy issues. Keeping information safe and secure is thus one of the biggest issues facing the information technology (IT) industry today. However, making the information available when necessary is also a necessary function.

There are several areas of concern regarding the protection of information including the danger of unrecoverable loss of the information itself and defense against unauthorized copying of the digital information. Also, the control of access to the information may pose certain risk factors to the owner of the information and to the thousands of other organizations who hold copies of this information for business reasons.

Further, unauthorized replication of information is a serious problem and may be illustrated with the notion of information theft, such as credit card numbers or social security numbers. While it is unlikely that the illicit copying of digital objects may be completely eradicated, original access to personal information needs to be controlled tighter. Additionally, the transit of this personal information needs to be protected as well as facilitated, such as, the passing of telephone numbers, email addresses, or the like.

Currently, there exists no general secure mechanism for someone to share their personal contact-list type information with others that would keep them from loosing it, sharing it, duplicating it, and allowing it to get out of date. Contact lists such as Lotus Notes®, address books, Outlook® contact databases, and Yahoo® contact databases, all store the personal information of the contacts in their databases, either locally and/or centrally. Being stored in a database means that the data is liable to be compromised by security failures and all the various infrastructures involved. In addition, there is no way for an individual to provide their contact information to an entity in a way that would prevent that entity from giving it away to others. Contact lists may also be duplicated and stored in more than one device so that keeping all the devices up to date may be a challenge.

Ultimately, information is valuable. The illicit use of information could cause a financial or privacy loss to the owner or confer an unfair advantage to another party. For example, organizations collect personal information and preferences and sell them on the open market as phone lists, market research, or the like. The individual who owns this information (i.e., the person themselves) is never directly or indirectly compensated. Instead, the information compilers or middlemen may essentially take an individual's information and sell the information. Not only does the individual not get compensated for the middlemen's and advertisers' use of the information but are also indiscriminately solicited or spammed as a result.

SUMMARY OF THE INVENTION

In an aspect of the invention, a method of managing personal information is provided. The method comprises depositing personal contact data into a secure Contact Management System (CMS) and identifying at least one entity to the secure CMS to enable access to the personal contact data by at least one entity. The method further provides specifying indicia to control access to the personal contact data and accessing the personal contact data by the at least one entity based on the indicia for allowing authorized access to the personal contact data.

In another aspect of the invention, a method of providing information to a second party is provided. The method comprises creating an account by an owner in secure vault and depositing contact information in the account. The method further comprises establishing a relationship between the contact information and a user of the contact information in the secured vault defined by indicia provided by the owner and accessing the contact information based on the indicia to allow controlled access to the contact information by an entity other than the owner.

In another aspect of the invention, a secure contact management system is provided. The system comprises a data storage medium which securely contains contact information and a registration system for registering a plurality of users. The system further comprises a contact information storage system which securely stores the contact information of a first user of the plurality of users and a contact information accessing system which accesses the contact information by a second of the plurality of users, wherein the accessing is controlled based upon indicia specified by the first of the plurality of users.

In another aspect of the invention, a computer program product comprising a computer usable medium having readable program code embodied in the medium is provided. The computer program product includes at least one component to deposit personal contact data by an owner into a secure contact management system (CMS) and identify at least one entity to the secure CMS to enable access to the personal contact data by the at least one entity. The computer program product also includes at least one component to specify indicia to control access to the personal contact data and access the personal contact data by the at least one entity based on the indicia allowing authorized access to the personal contact data.

DETAILED DESCRIPTION OF EMBODIMENTS OF THE INVENTION

This invention is, generally, in one embodiment, directed to a system and method for providing a contact management system based on an information vault so that individual owners of personal data, such as contact information, may securely control and manage the access and dissemination of the personal data to other users via pre-defined arrangements. The system and method may also provide for the owner of the personal data to receive compensation for the use of the personal data.

Figure 1:
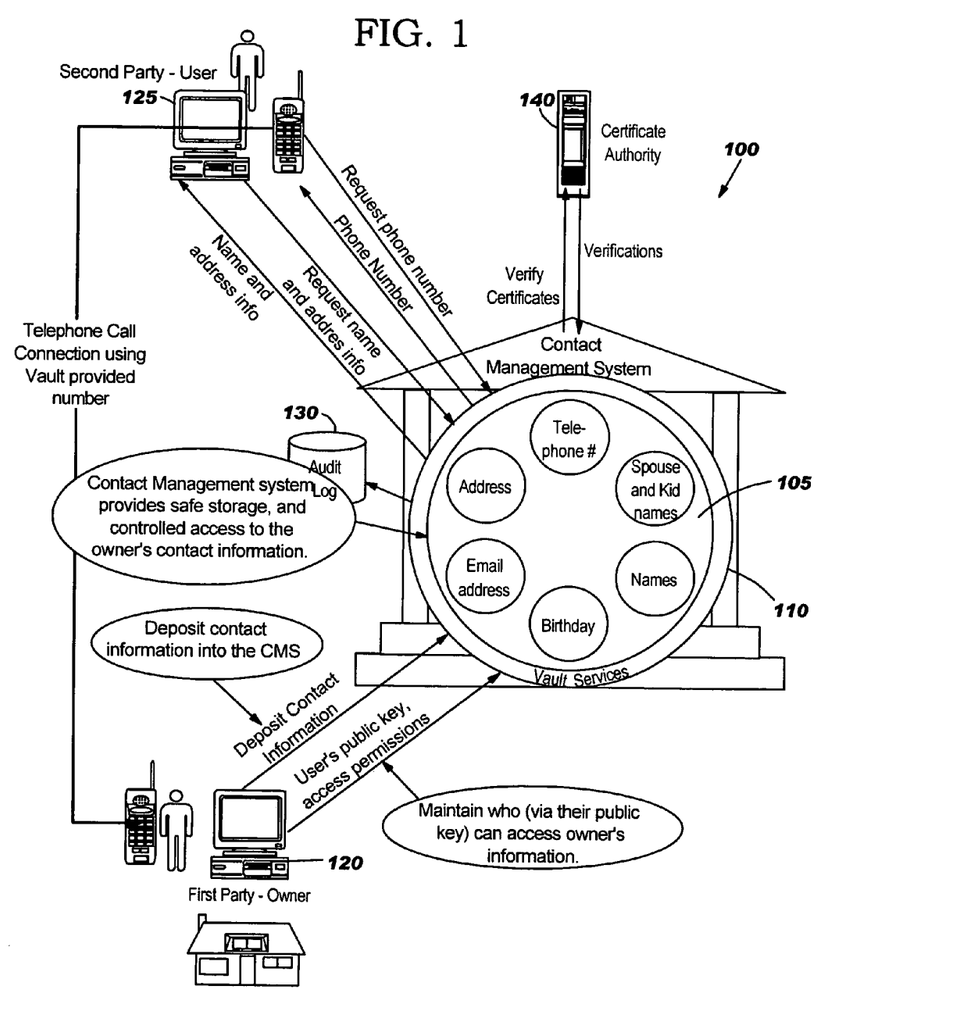
FIG. 1 is an exemplary overview of an embodiment of the invention.

FIG. 1 is an exemplary overview of an embodiment of the invention. A "Contact Management System" (CMS), generally denoted by reference numeral 100, provides for an information infrastructure to secure and conditionally provide access to stored information. The CMS 100 employs current data storage 105 and security technologies to provide a secure storage mechanism for user's information, such as for example, name, address, phone numbers, email addresses, family information, or similar personal data. This secured storage and associated services are also known as an information vault, or simply, a vault. A computer system 120 (e.g., a personal computer) may be employed by a user to read or remove personal information from the vault or to deposit information to the vault.

The set vault of vault services 110 are built on the CMS's secure storage to allow users to create accounts, deposit information in any form, and read, update or remove the information. Information may be stored in the vault encrypted by the vault and optionally, users may encrypt the information with their own private key.

In addition, vault services 110 are provided to allow a user to specify conditions, in a secure way via technologies of the existing Public Key Infrastructure (PKI), so that a second party 125 may have read access to certain, sharable portions of the user's information. All accesses typically use the first and second party's public keys as identification. To share information with a second party, a contract data token specifying the two parties' public keys may be created and digitally signed by the first party's private key to ensure that access to private information is not propagated beyond the second party. This feature of the invention allows a migration away from the current approach of users providing second party entities (e.g. online web merchants or acquaintances) their personal information and thereafter compelled to trust the merchants to securely protect the information from compromise.

With this invention's approach, the user/owner provides the second party 125 permission upon a request, to read an agreed upon set of personal information such as phone numbers, names, addresses, or the like. As the information is thereafter always available to the second party (at least until cancellation or recasting of the permissions), there is no longer any need for the second party to store the user's personal information within its own databases or devices. As a trusted third party for information, then, the information vault 100 significantly contributes to the elimination of the escalating dangers of identity theft and significantly reduces the need for duplicate copies of information.

The invention, therefore, establishes the ability of a user to maintain their public personal contact information in the CMS 100. The user may deposit this contact information into the CMS 100 via their key. Along with the deposit, the user may specify access permissions and second party identification information, i.e., who may access this information.

The CMS 100 also provides for a secured linkage service between providers; that is, the owners of information, and the users of the contact information. This service securely stores the deposit contact information in an information vault. This service also allows certain users access to permitted parts of the owner's information. For example, a telephone or similar device under a user's control may access the CMS 100 to obtain the telephone number of another person. Once used to dial a person, the number is not saved in the phone in a way that may allow it to fall into unapproved hands. Similarly, a PC-based contact list may access the CMS 100 to acquire the name and address information of another user. Thus, no local storage may be required since the access may be performed in real time. This centralized storage of information in a vault, therefore, limits the liability of misplacing someone's personal contact information and avoids duplication or inadvertent propagation of the information.

The invention may therefore provide for securely accessing contact information where users may establish digital certificates and public keys that would be a basis for sharing contact information. For example, if a user chooses to share a telephone number with a friend so that the friend may call, a public key may be associated with the user account in an information vault, thereby establishing a relationship between the friend's identity and the user account. The public key would be given to the friend so that the friend may access the user's telephone number in the vault.

In this manner, the telephone number may only be stored in the information account within the vault and never in the friend's devices or others' devices. The friend would need to only store the user's public key in their device, such as, for example, phones, laptops, personal digital assistance (PDAs), or the like. The device may authenticate the friend as the owner of the device (e.g., via digital certificate and passphrase). Typically, these devices may be configured to know how to access the information vault when the friend tries to call. Upon access, the information vault returns to the requesting device, a current telephone number, for example, upon receipt, and the phone would end up placing a call. This allows:

(i) the information to not be given to anyone else, (ii) the telephone number to not be compromised if the device is lost, and (iii) insures that the correct telephone number is always available.

In a similar manner, other contact information such as address, email, instant message idea, or the like, may be shared so that it is never stored locally on a local user's device. Address information for a PC-based contact list may be accessed from the CMS 100 and used or displayed, when needed. Accordingly, in this manner, the contact information avoids being persistently stored locally. The access to the information vault, for example, may be based on the public keys of those in an address list which are stored locally in devices and a private key to authenticate a user with the information vault, which may then provide the local computer with the contact information to display or use.

The CMS and method provides for, but not limited to:

users to register with the system and for registered user to upload their contact information to a repository;

registered users to change contact information in the repository;

registered users to tell the CMS to allow other registered users to have access to certain or a portion of their contact information;

registered users to revoke access to contact information; and/or those with permission to access the contact information as they need it.

The CMS also provides for a public key infrastructure (PKI) based secured information vault to hold personal contact information.

To this end, the system and method of the invention provides a trusted storage of personal data, thereby minimizing the number of copies of personal information that may be in existence. Second party access to the trusted storage of personal data may be made on-demand, as required for commerce or convenience, with a process for assessing fees for accesses.

Figure 2:
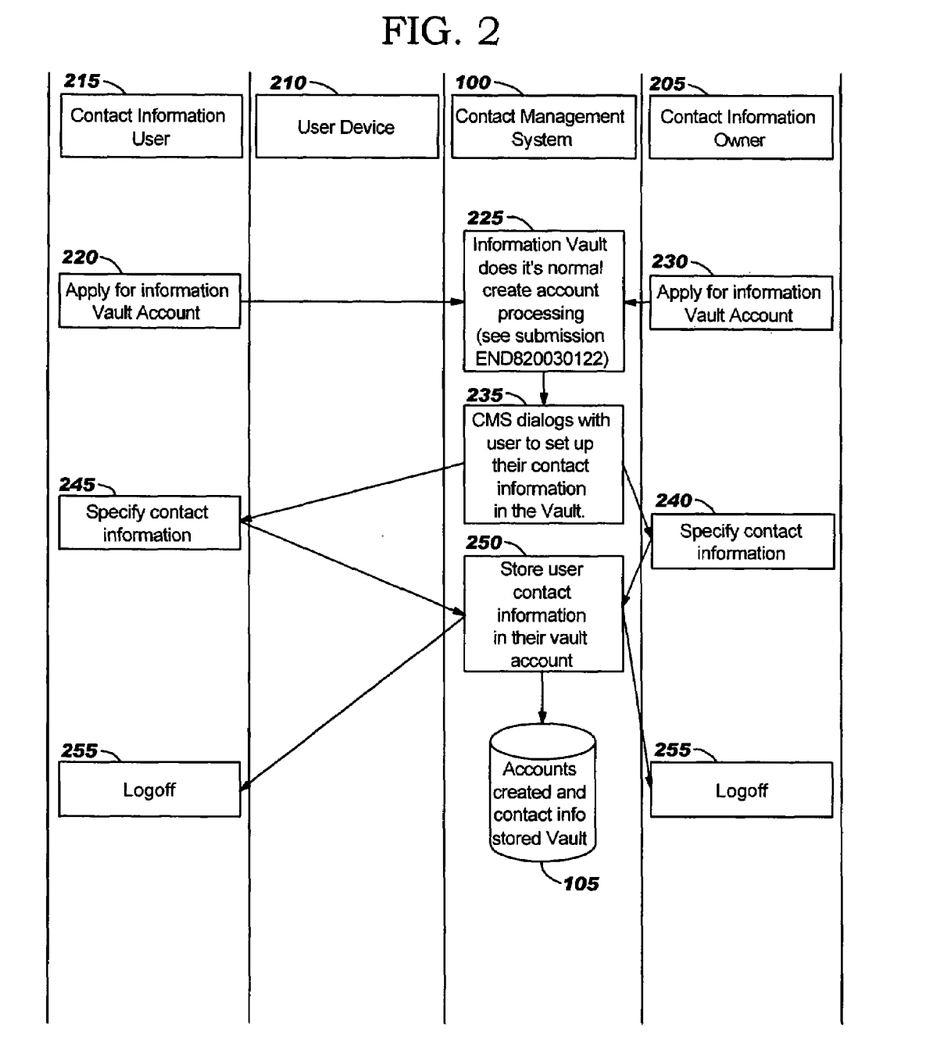
FIG. 2 is a swim lane diagram showing steps of an embodiment of registering and uploading contact information, in accordance with the invention.

FIG. 2 is a swim lane diagram showing steps of an embodiment of a registering and uploading contact information. "Swim lane" diagrams may be used to show the relationship between the various "actors" in the processes and to define the steps involved in the processes. FIG. 2 (and all the other swim lane figures) may equally represent a high-level block diagram of components of the invention implementing the steps thereof. The steps of FIG. 2 (and all the other Figures employing swim lane diagrams) may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network. The steps of FIG. 2 (and the other swim lane Figures) may also be implemented by the embodiment of FIG. 1.

Referring to FIG. 2, four swim lanes are shown including a lane for a CMS 100, contact information owner 205, a user device 210 and contact information user 215. At step 220, a contact information user 215 applies for an information vault account. At step 225, the information vault performs account processing and authenticates the contact information user 215, an implementation of which can be found in co-pending U.S. patent application Ser. No. 10/965,592. At step 230, a contact information owner may apply for an information vault account. At step 235, the CMS dialogues with the user(s) to set up their contact information in the vault. This dialog is typically performed for every owner and user independently, with each user and owner separately supplying their own contact information.

At step 240, the contact information owner specifies their contact information. Likewise, at step 245, the contact information user specifies their contact information. At step 250, the CMS stores each user's contact information in their vault account, typically encrypted. A fee may be charged for the transaction. At step 255, each user may log off. The accounts are created and the contact information is stored in the information vault 105.

Figure 3:
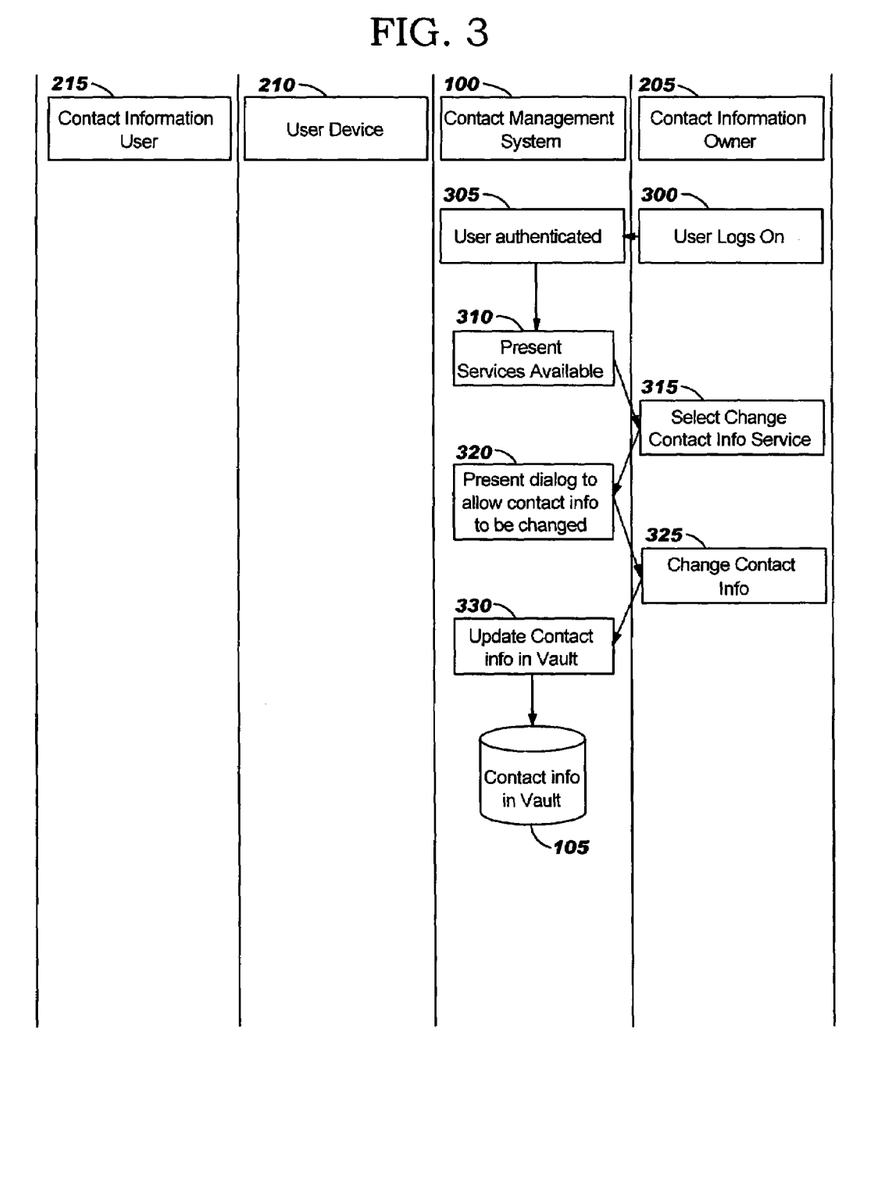
FIG. 3 is a swim lane diagram showing steps of an embodiment of changing information in the contact management system, in accordance with the invention.

FIG. 3 is a swim lane diagram showing steps of an embodiment of changing information in the CMS. At step 300, a contact information owner logs onto the system. At step 305, the contact information owner is authenticated by the CMS. At step 310, the CMS presents which services are available to the authenticated contact information owner. At step 315, the contact information owner selects an option to change contact information from the services provided by the CMS.

At step 320, the CMS presents a dialogue (for example, a graphical user interface) to the contact information owner to change contact information. At step 325, the contact information owner changes any contact information, as appropriate. At step 330, the user submits the updated information to the vault as provided by the contact information owner. The contact information changes may be submitted and stored in the vault 105. A fee may be charged for the transaction. The process then ends.

Figure 4:
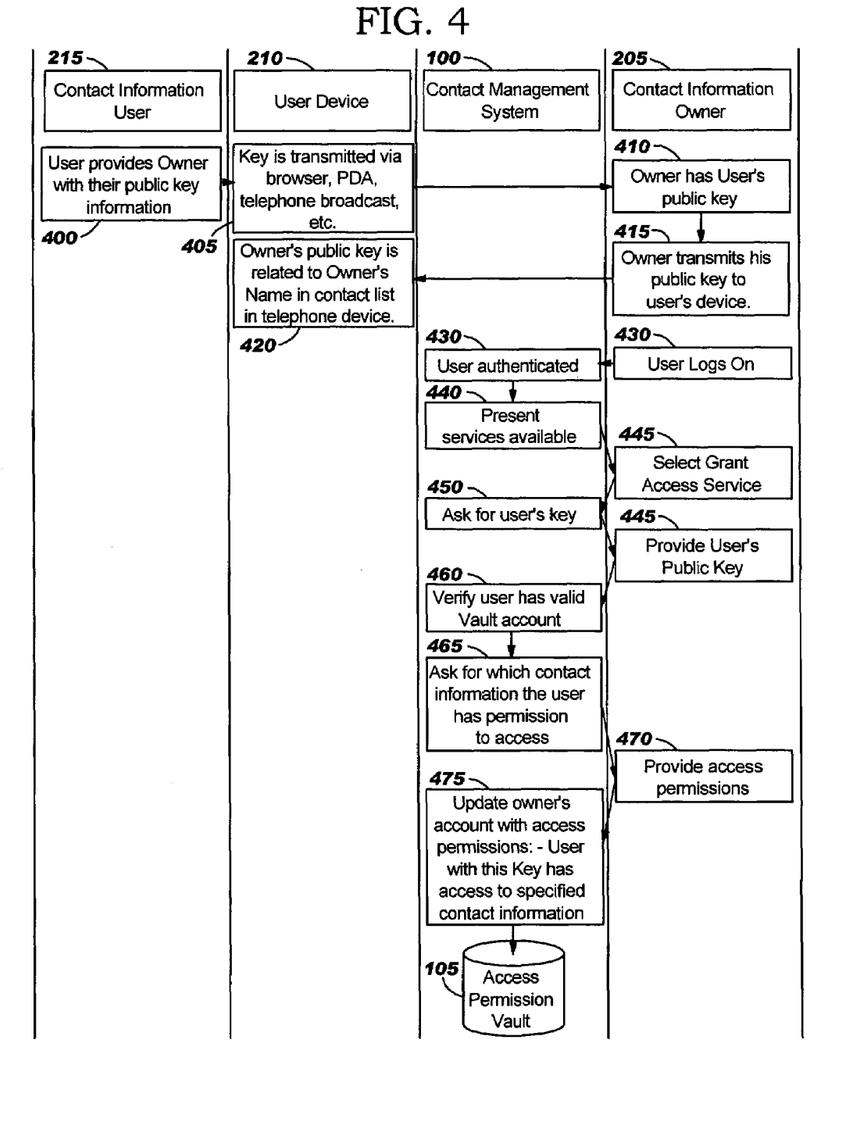
FIG. 4 is a swim lane diagram showing step of embodiment of access specification to an owner's contact information, in accordance with the invention.

FIG. 4 is a swim lane diagram showing step of embodiment of an owner specifying with the CMS who may have access to the owner's contact information as stored in the vault of the CMS. At step 400, the contact information user provides a contact information owner with their public key information. At step 405, a public key of the contact information user is transmitted via a browser, a PDA, a telephone broadcast, or the like, to the contact information user. This accomplished by transferring from a user (i.e., the accessor), to the owner, via any of several mechanisms, including wireless transmission between PDAs or browser access at CMS, the public key information of the user.

At step 410, the contact information owner receives the contact information user's public key. At step 415, the contact information owner transmits the contact information owner's public key to the contact information user's device. At step 420, the contact information owner's public key is related to the owner's name in a contact list in a telephone device of the contact information user. The telephone device may include various types of devices such as PDAs, browsers, computers, or the like. At step 430, the contact information owner may log on to the CMS.

At step 435, the contact information owner is authenticated by the CMS. At step 440, the CMS presents the services that are available to the contact information owner. At step 445, the contact information owner selects a service for granting access. At step 450, the CMS prompts for the contact user's key. At step 455, the contact information owner provides the contact information user's public key to the CMS. At step 460, the CMS verifies that the contact information user has a valid vault account. At step 465, the CMS asked for which contact information the contact information user has permission to access. At step 470, the contact information owner provides the information concerning the access permissions in response to the CMSs query. At step 475, the CMS may update the contact information owner's account with the access permissions associated with the contact information user. The contact information user with this key will now have access to the specified contact information. The owner's account with access permissions are then stored in the vault 105. A fee may be charged for the transaction.

Figure 5:
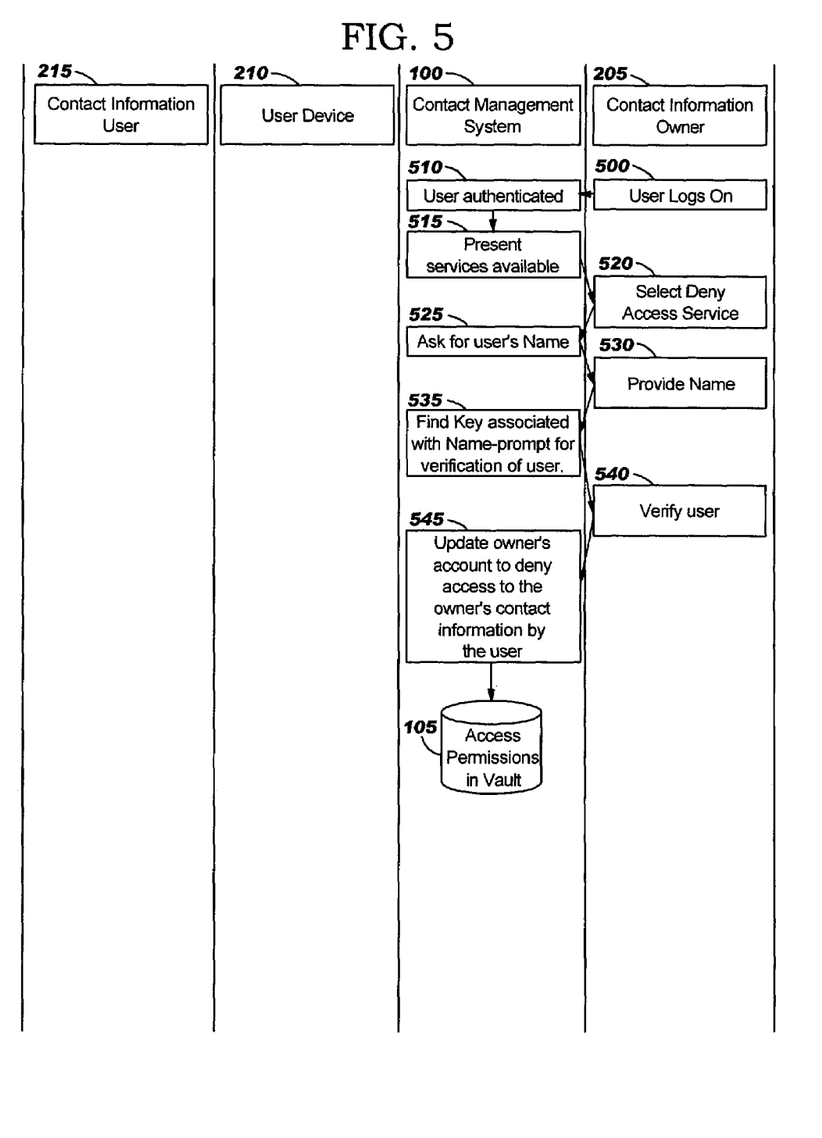
FIG. 5 is a swim lane diagram showing steps of an embodiment of an owner revoking access to their contact information, in accordance with the invention.

FIG. 5 is a swim lane diagram showing steps of an embodiment of an owner revoking access to their contact information. At step 500, a contact information owner logs onto the CMS. At step 510, the contact information owner is authenticated by the CMS. At step 515, the CMS presents services that are available to the contact information owner, perhaps by a graphical user interface. At step 520, the contact information owner selects the appropriate service to facilitate "deny access" to contact information. At step 525, the CMS asks for the contact information user's name (or names) to be denied access.

At step 530, the contact information owner provides the name (or names) for the contact information user(s) who may be denied access or has modifications made to their profile. At step 535, the CMS locates the key associated with the contact information user(s) and prompts for the verification of this user(s). At step 540, the contact information owner verifies that the CMS has located the appropriate information user(s). At step 545, the CMS updates the contact information owner's account to deny access to the owner's contact information by the contact information user(s) specified. This update information is then stored and updated in the vault data base. A fee may be charged for the transaction.

Figure 6:
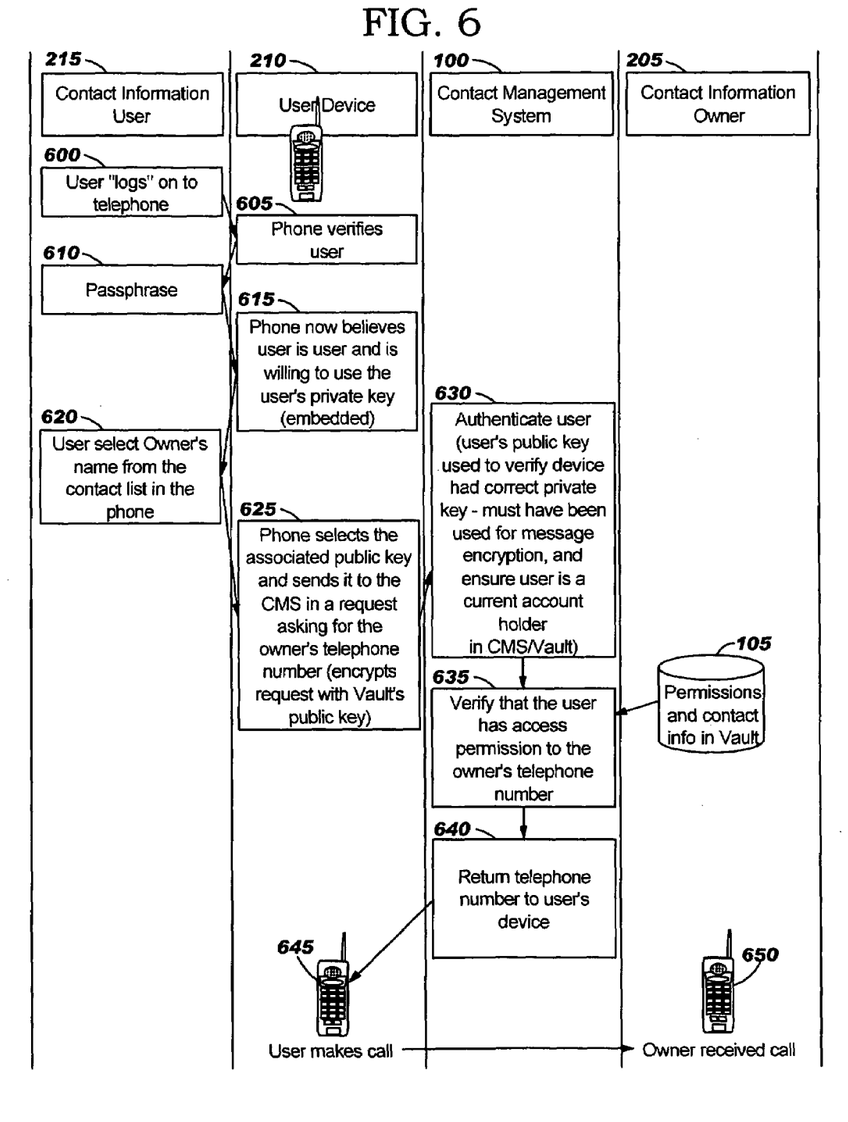
FIG. 6 is a swim lane diagram showing steps of embodiment of accessing a contact information user's information, in accordance with the invention.

FIG. 6 is a swim lane diagram showing steps of embodiment of a contact information user accessing a contact information user's information stored in the CMS. At step 600, the contact information user logs onto the telephone. This may include identifying the contact information user to the telephone by password, pass-phrase, PIN, or a biometric entry, for example. At step 605, the phone (or similar device) verifies the contact information user by verifying the password, pass-phrase, PIN, or biometric, as appropriate. At step 610, a pass-phrase, or other identification, may be input by the contact information user. At step 615, the phone now believes the contact information user is an appropriate user and uses the contact information user's private key for future encryption.

At step 620, the contact information user selects the contact information owner's name (or other appropriate identifier) from the contact list in the phone. At step 625, the phone selects the public key associated with the identified person and sends it to the CMS in a request asking for the contact information owner's telephone number, for example. This request is encrypted with the vault's public key. At step 630, the CMS authenticates the contact information user. This may be accomplished by using the contact information user's public key and verifying that the user device had correctly encrypted the request message using the user's private key. This private key should have been used for the message encryption and assures that the contact information user is a current account holder in the CMS.

At step 635, the CMS verifies that the contact information user has access permission to the contact information owner's telephone number or other information, as appropriate. This is performed by accessing the permissions and contact information from the vault. At step 640, the CMS returns the telephone number and other appropriate information to the contact information user's device. A fee may be charged for this access.

At step 645, the user device makes a telephone call using the information return by the CMS. At step 650, the contact information owner receives a call placed using the information retrieved from the CMS and placed by the contact information user's telephone or other similar device.

EXAMPLE OF USE

By way of an illustrative example, the invention provides contact information users (or one or more entities) with the contact information owner's contact information in real-time. This type of access is protected by the information vault's PKI based security mechanisms which may require devices like phones, computers, or PDAs to contain embedded PKI digital certificates.

The phone (or other similar device) may authenticate the contact information user via a pass-phrase, personal identification number (PIN) or biometric, thus enabling the phone to securely communicate with the CMS vault. The vault's public key may be used to encrypt communication to the CMS. Thus, the CMS trusts that the correct contact information user is at the other end of the communication link and that the message has not been compromised in transit. Once the contact user has logged on to the phone and selected the name of the person to be called, the phone connects to the CMS, the connection is secured and phone asks for the telephone number of the contact information owner. At which time, the CMS provides the contact information for use. The telephone may then automatically place a call avoiding storing the telephone number or any returned data in persistent telephone memory such as disk, CD-ROM, or long term memory (e.g., EEPROM, FLASH, or the like). The telephone call includes traditional telephone calls, wireless calls, Internet calls, voice-over-internet protocol (VoIP) calls, or the like. The telephone address may include any number of addressing schemes including traditional telephone numbers or other network addresses such as Internet addresses.

While the invention has been described in terms of embodiments, those skilled in the art will recognize that the invention can be practiced with modifications and in the spirit and scope of the appended claims.

What is claimed is:

1. A method of managing personal information, comprising:

depositing personal contact data into a secure contact management system (CMS);

identifying at least one entity to the secure CMS to enable access to the personal contact data by the at least one entity;

specifying indicia to control access to the personal contact data; and allowing access of the personal contact data by the at least one entity based on the indicia for allowing authorized access to the personal contact data, wherein the personal contact data is encrypted and associated with an owner's public key, the access by the at least one entity is accomplished using a device being at least any one of a telephone device, a personal digital assistant device (PDA) and a computer, and the device avoids storing any of the personal contact data in persistent memory.

2. The method of claim 1, further comprising charging a fee for depositing or accessing the personal contact data.

3. The method of claim 1, further comprising authenticating the owner of the personal contact data and the at least one entity.

4. The method of claim 1, wherein the specifying the indicia includes defining which portions of the personal contact data that is accessible by the at least one entity.

5. The method of claim 1, wherein the accessing is based on the public key of the owner of the personal contact data to locate the personal contact data.

6. The method of claim 1, further comprising returning the personal contact data to the device used during the accessing and automatically placing a telephone call based on the returned personal contact data.

7. The method of claim 6, wherein the returned personal contact data avoids being stored in persistent memory in the device.

8. The method of claim 1, further comprising one of updating the personal contact data, denying access to the personal contact data, changing access information to the personal contact data and changing the indicia.

9. The method of claim 1, wherein:

the personal contact data is associated with an owner, and the at least one entity is a person other than the owner.

10. A method of providing information to a second party, comprising:

creating an account of an owner in a secure vault;

receiving deposited contact information in the account;

establishing a relationship between the contact information and a user of the contact information in the secured vault defined by indicia provided by the owner; and allowing access to the contact information based on the indicia to allow controlled access to the contact information by the user other than the owner, wherein the contact information is encrypted using a public key of the vault, and the allowing access includes returning the contact information to a user's device for use without storing the contact information in persistent memory in the user's device.

11. The method of claim 10, further comprising authenticating the owner and the user to permit access to the contact information.

12. The method of claim 10, wherein the indicia defines conditions for accessing the contact information.

13. The method of claim 12, wherein the conditions include at least any one of an identity of the user permitted to access the contact information, a telephone number, an address and a personal data.

14. The method of claim 10, wherein:
the contact information is associated with the owner, and
the user is a person other than the owner.

15. A secure contact management system, comprising:
a data storage medium which securely contains contact information;
a registration system which registers a plurality of users;
a contact information storage system which securely stores the contact information of a first user of the plurality of users; and
a contact information accessing system which accesses the contact information by a second user of the plurality of users and prevents the contact information from being stored in persistent memory of a device used by the second user to access the contact information, wherein the accessing is controlled based upon indicia specified by the first user and the contact information is encrypted and associated with the first user's public key.

16. The system of claim 15, further comprising a charging system for charging any user of the plurality of users including the first user of the plurality of users, the second user of the plurality of users or an owner of the contact information for the storing or accessing the contact information.

17. The system of claim 15, further comprising a contact utilization system for controlling access and use of the contact information in the data storage medium.

18. The system of claim 15, wherein the first user differs from the second user.

19. A computer program product comprising a computer usable medium having readable program code embodied in the medium, the computer program product includes at least one component to:
deposit personal contact data by an owner into a secure contact management system (CMS), wherein the personal contact data is encrypted and associated with the owner's public key;
identify at least one entity to the secure CMS to enable access to the personal contact data by the at least one entity;
specify indicia to control access to the personal contact data; and
access the personal contact data by the at least one entity, without storing the personal contact data in persistent memory of a device used to access the personal contact data, based on the indicia allowing authorized access to the personal contact data.

20. The method of claim 19, wherein:
the personal contact data is associated with the owner, and
the at least one entity is a person other than the owner.

* * * * *

UNITED STATES PATENT AND TRADEMARK OFFICE
CERTIFICATE OF CORRECTION

PATENT NO. : 7,660,770 B2
APPLICATION NO. : 10/964876
DATED : February 9, 2010
INVENTOR(S) : Grim, III et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 327 days.

Signed and Sealed this

Thirtieth Day of November, 2010

David J. Kappos
*Director of the United States Patent and Trademark Office*